United States Patent
Ip et al.

(10) Patent No.: US 8,984,461 B1
(45) Date of Patent: Mar. 17, 2015

(54) VISUALIZATION CONSTRAINTS FOR CIRCUIT DESIGNS

(71) Applicant: Jasper Design Automation, Inc., Mountain View, CA (US)

(72) Inventors: Chung-Wah Norris Ip, Cupertino, CA (US); Chien-Liang Lin, San Jose, CA (US)

(73) Assignee: Jasper Design Automation, Inc., Mountain View, CA (US)

( * ) Notice: Subject to any disclaimer, the term of this patent is extended or adjusted under 35 U.S.C. 154(b) by 0 days.

(21) Appl. No.: 14/044,681

(22) Filed: Oct. 2, 2013

(51) Int. Cl.
*G06F 17/50* (2006.01)

(52) U.S. Cl.
CPC ................ *G06F 17/5045* (2013.01)
USPC .......................... 716/113; 716/132

(58) Field of Classification Search
CPC ................ G06F 17/50; G06F 9/455
USPC .................................. 716/113, 132
See application file for complete search history.

(56) References Cited

U.S. PATENT DOCUMENTS 7,379,782 B1 * 5/2008 Cocco ........................ 700/103

* cited by examiner

*Primary Examiner* — Thuan Do
(74) *Attorney, Agent, or Firm* — Vista IP Law Group, LLP

(57) ABSTRACT

A first waveform for a circuit design is received. The first waveform includes at least an actual value of a signal of the circuit design at one or more clock cycles. A user input for a cursor is received, and a signal wave overlay is displayed on the first waveform having an appearance corresponding to a location of the cursor. The signal wave overlay indicates a desired value of the signal at one or more clock cycles that is different than the actual value of the signal in the one or more clock cycles. Based on the desired value of the signal indicated by the signal wave overlay, a visualization constraint for the circuit design is generated. The visualization constraint is used to generate a second waveform, where the visualization constraint restricts the second waveform.

24 Claims, 9 Drawing Sheets

US 8,984,461 B1

VISUALIZATION CONSTRAINTS FOR CIRCUIT DESIGNS

BACKGROUND

This invention relates generally to analysis of circuit designs, and more particularly to interactively generating visualization constraints for circuit designs.

As the complexity in circuit design has increased, there has been a corresponding improvement in various kinds of verification and debugging techniques. In fact, these verification and debugging techniques have evolved from relatively simple transistor circuit-level simulation (in the early 1970s) to logic gate-level simulation (in the late 1980s) to the current art that uses Register Transfer Language (RTL)-level simulation, and formal verification. RTL describes the registers of a computer or digital electronic system and the way in which data are transferred among the combinational logic between registers.

During some of these verification techniques, a circuit design is simulated or tested against a set of properties to evaluate the operation of the circuit design. In simulation, inputs provided by a circuit designer are used to determine values for variables in the circuit design over one or more clock cycles. The values determined using the provided inputs are displayed to the circuit designer as waveforms, which may enable the circuit designer to assess whether the circuit design exhibits desired behaviors. If the designer is looking for a particular behavior of the circuit design exhibited in a waveform, the designer modifies the inputs used for simulation until the waveform shows the desired behavior. Similarly, if testing a circuit design against a set of properties, the designer modifies the properties or the circuit design until the output of the test confirms that the circuit design meets desired behaviors or demonstrates that the circuit design does not meet the desired behaviors.

Circuit designers sometimes verify a circuit design in the presence of constraints, which force the waveform to meet a certain set of conditions. During the testing of a circuit design, many different constraints may be needed before a waveform illustrates a behavior of the circuit design that is of interest to a circuit designer.

SUMMARY

Embodiments of the invention provide mechanisms for interactively generating visualization constraints for a circuit design. A waveform for the circuit design is received, and the waveform is displayed to a circuit designer. A user input for a cursor is received. Based on the user input, a signal wave overlay is displayed on the first waveform. The signal wave overlay has an appearance corresponding to a location of the cursor, and indicates a desired value of the signal at one or more clock cycles that is different than an actual value of the signal in the one or more clock cycles. Based on the desired signal values indicated by the overlay, visualization constraints for the circuit design are generated, where a visualization constraint for a signal of circuit design defines a desired behavior of waveforms generated for the signal.

In one embodiment, the visualization constraints are used to generate new waveforms exhibiting the behaviors the designer identified as being of interest. In other embodiments, the visualization constraints are input to a simulation or formal verification tool as properties of the circuit design for testing the circuit design. Accordingly, embodiments described herein provide an intuitive, interactive method for circuit designers to generate visualization constraints for circuit designs despite a lack of fluency in a verification language. In one embodiment, the signal can be a single bit signal that has single bit values, a multi bit signal that has multi bit values, or a signal that takes on enumerated values.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments are described herein with respect to interactively generating visualization constraints for signals of a circuit design. However, other embodiments are directed towards interactively generating properties for formally verifying a circuit design.

Figure 1:
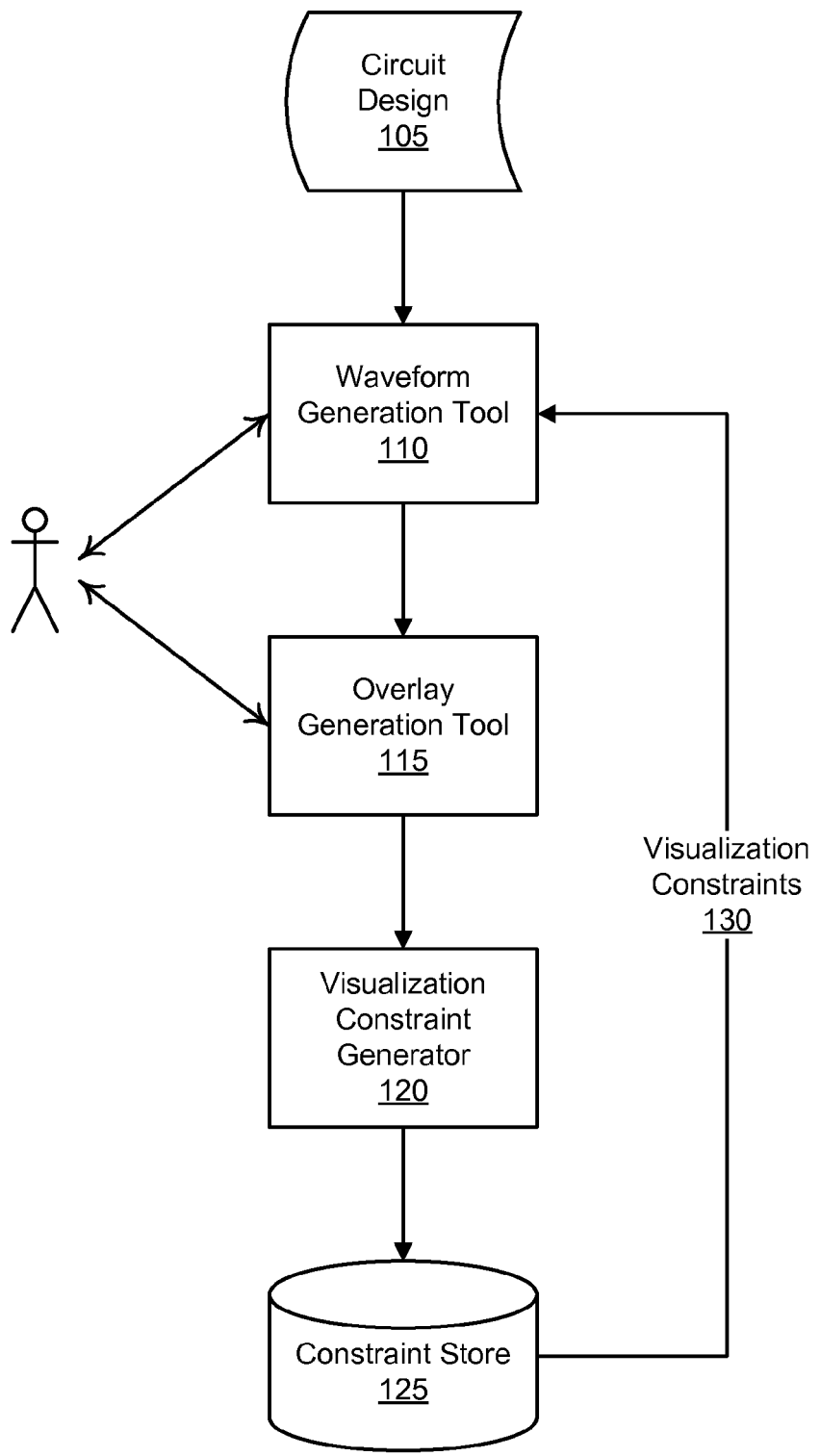
FIG. 1 is a diagram of a system for interactively generating visualization constraints for a circuit design, according to one embodiment.
Figure 2:
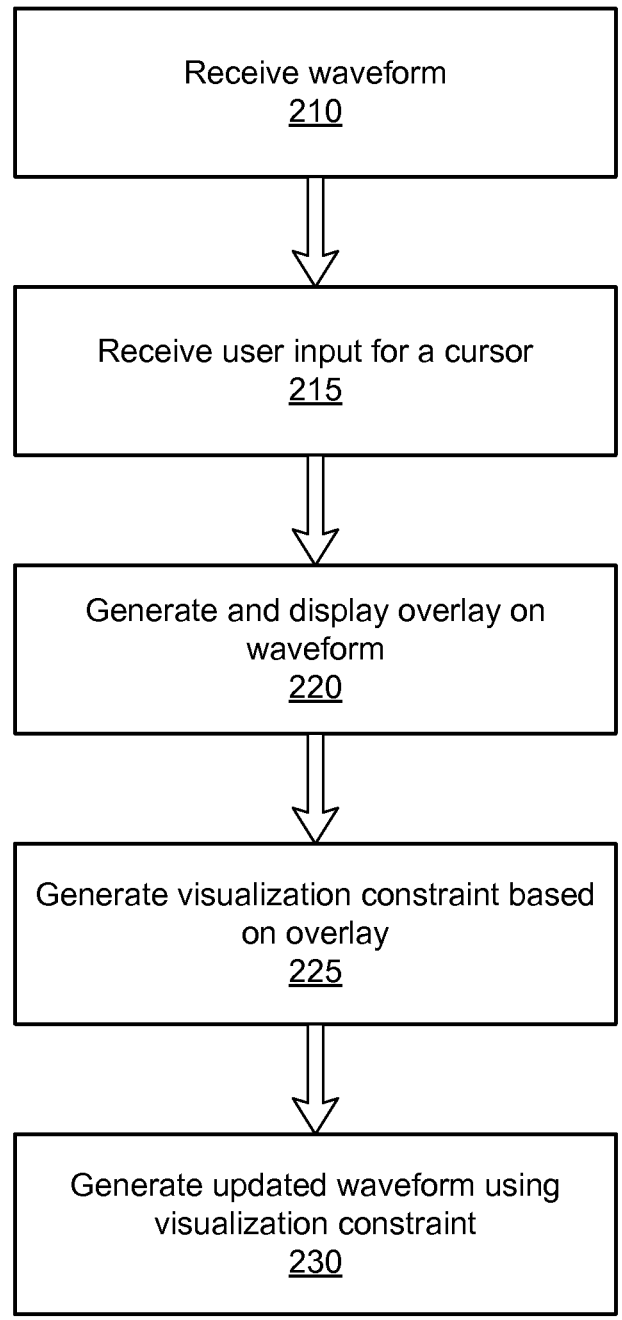
FIG. 2 is a flowchart illustrating a method for interactively generating visualization constraints for a circuit design, according to one embodiment.

FIG. 1 illustrates one embodiment of a system for interactively generating visualization constraints for a circuit design, and FIG. 2 illustrates one embodiment of a process for indexing behaviors of a circuit design using the system of FIG. 1. The process is performed for a particular circuit design 105. The circuit design 105 may exist as a machine-executable description, such as circuit design model, register-transfer-level (RTL) digital design model, a system-level design model, or any other appropriate model for describing a circuit design. The circuit design 105 specifies a data type of variables in the circuit design and permissible values of the variables. For example, the circuit design 105 defines a radix and number of bits for a variable in the circuit. As another example, the circuit design 105 designates a variable as an enumerated type and lists the enumerators of the enumerated type.

The waveform generation tool 110 receives 210 one or more signal waveforms, which are displayed to the circuit designer. The waveform generation tool 110 may receive 210 waveforms generated using any of a variety of techniques, such as simulation or formal verification techniques. Each waveform received by the waveform generation tool 110 shows one or more signal waves of the circuit design over one or more clock cycles, in which a signal wave includes a sequence of values of a signal in the circuit design 105. By viewing a waveform representation of a signal, the circuit designer can visualize behaviors of the circuit design and determine how accurately the circuit design 105 reflects the designer's intents for the circuit.

The overlay generation tool 115 receives 215 a user input for a cursor (e.g. a mouse input). The user input defines a desired value for a signal in one or more clock cycles that is different than a current value of a signal shown in a waveform, and may comprise one of several possible interactions with a waveform. For example, the user input may comprise selecting a desired value for one or more cycles of the waveform. In another example, a user input comprises a selection of one or more cycles of the waveform and an alphanumeric input specifying a desired value for the selected cycles. As yet another example, a user input comprises a selection of a first cycle having a desired value followed by a selection of one or more other cycles of the waveform, indicating that the value of the waveform in the first cycle is a desired value for each of the selected cycles. Various other example user inputs are described in further detail with respect to FIGS. 4-8.

Based on the received user input, the overlay generation tool 115 generates and displays 220 a signal wave overlay on the waveform. The signal wave overlay has the appearance of a waveform that is overlaid on a signal wave, and indicates a desired value of a signal in one or more clock cycles that is different than an actual value of the signal shown in the one or more clock cycles. The overlay may highlight or emphasize one or more cycles of the waveform near the location of the cursor (e.g., a mouse cursor). The overlay can visually distinguish the cycle corresponding to the cursor location from other cycles of the waveform. In one embodiment, an overlay has the appearance of an alternate waveform with a line of a different weight, pattern, and/or color than the underlying waveform. In another embodiment, the overlay includes a semi-transparent box displayed over a cycle of the waveform to highlight the cycle. In one embodiment, based on the overlay generated by the overlay generation tool 115 in response to a designer's input, the designer specifies visualization constraints without typing or otherwise interacting with a temporal expression.

The overlay generation tool 115 generates and displays 220 the signal wave overlay based on a location and movements of a cursor. In one embodiment, the overlay generation tool 115 receives information about locations of waveforms on a display screen, and receives information about the location of the cursor on the screen. Based on the received locations, the overlay generation tool 115 identifies a particular waveform and cycle of the waveform corresponding to the cursor location. Using the circuit design 105, the overlay generation tool 115 determines possible values for the signal corresponding to the identified waveform. For example, the overlay generation tool 115 determines possible values using the number of bits contained in the signal, the radix of the signal, and, if the signal includes a sequence of an enumerated type, the enumerators of the enumerated type. The overlay generation tool 115 may also identify a desired value for the signal and location of the overlay based on the cursor location. If the signal comprises a sequence of binary or Boolean values (i.e., 1 or 0), the overlay generation tool 115 determines whether the cursor is above or below a centerline of the waveform. When the cursor is above the centerline, the overlay generation tool 115 assigns a value of 1 to the overlay. When the cursor is below the centerline, the overlay generation tool 115 assigns a value of 0 to the overlay.

Figure 3A:
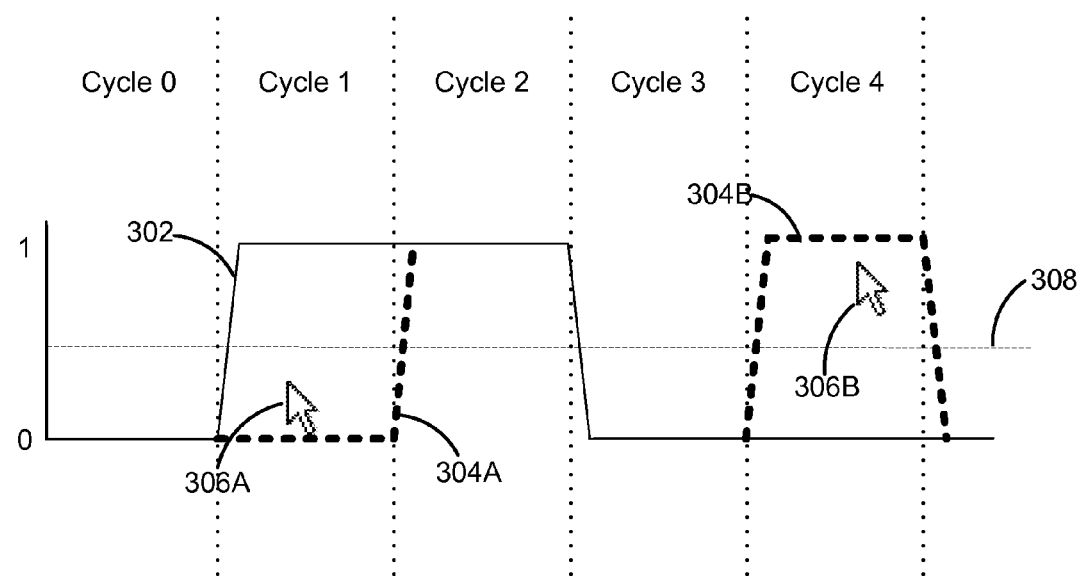
FIGS. 3A and 3B illustrate example waveforms and overlays, according to one embodiment.
Figure 3B:
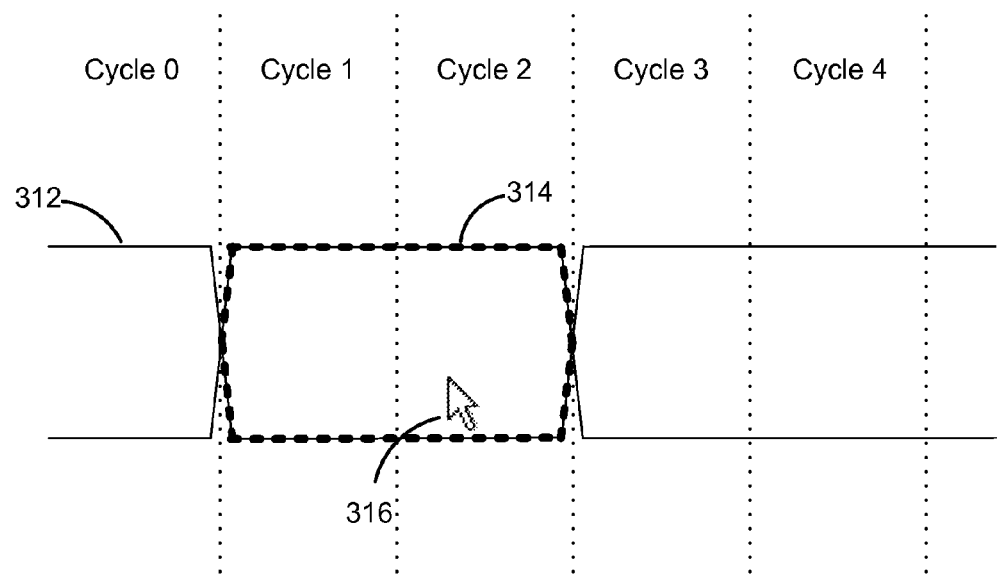

Example overlays generated by the overlay generation tool 115 are illustrated in FIGS. 3A and 3B. In FIG. 3A, a waveform 302 (shown with the solid line) is displayed showing binary values of a signal over five clock cycles, Cycle 0 through Cycle 4. In each cycle, the signal corresponding to the example waveform 302 has a binary value of 0 or 1. When the designer moves a cursor 306 near the displayed waveform 302, the overlay generation tool 115 displays an overlay 304 (represented by a dotted line) on the waveform 302 corresponding to a location of the cursor 306. In particular, the overlay generation tool 115 displays the overlay 304 on a clock cycle of the waveform 302 in response to the designer placing the cursor 306 within a spatial extent corresponding to the cycle. In the example illustrated in FIG. 3A, the overlay 304 represents a desired value of the signal in the cycle in which the cursor 306 is located.

The desired value of a signal, as indicated by the overlay 304, can be different than the actual value of the signal. For example, in cycle 1, the actual value of signal 302 is a binary 1, but the overlay 304A indicates that the desired value of the signal 302 is a binary 0. As another example, in cycle 4, the actual value of signal 302 is a binary 0, but the overlay 304B indicates that the desired value of the signal 302 is a binary 1. In one embodiment, portions of the overlay 304 may indicate a desired value of a signal 302 that is the same as the actual value of the signal 301. This is typically used when the actual value is not explicitly enforced by the current set of visualize constraints for generating the current waveform, and the user would like the same actual value to be present in future waveforms.

In one embodiment, the overlay generation tool 115 determines the value of the overlay based on the location of the cursor 306. As illustrated in FIG. 3A, the cursor 306A is located below a centerline 308 of the waveform 302 in cycle 1. In response to the cursor 306A being located below the centerline 308, the overlay generation tool 115 generates the overlay 304A displaying a binary 0 value in cycle 1. Similarly, the cursor 306B is located above the centerline 308 in cycle 4. In response to the cursor 306B being located above the centerline 308, the overlay generation tool 115 generates the overlay 304B displaying a binary 1 value in cycle 4. In another embodiment, the circuit designer specifies the value of the overlay 304. For example, the overlay 304A indicates a value of 0 in response to the designer selecting the overlay 304A and dragging it downwards to the value of 0.

FIG. 3B illustrates another example waveform 312, in which the signal corresponding to the waveform 312 comprises a sequence of bus values. As shown in FIG. 3B, the overlay generation tool 115 displays an overlay 314 on the bus block in cycles 1 and 2 of the waveform 312 in response to the cursor 316 being located within a spatial extent corresponding to cycle 2. Alternatively, rather than highlighting the entire bus block corresponding to the cursor's location, the overlay 314 may be displayed only within cycle 2.

Although the example overlays 304, 314 shown in FIGS. 3A and 3B are represented by dotted lines, various other configurations for the overlay generated by the overlay generation tool 115 are also possible, such as lines of different colors outlining the waveform or semi-transparent boxes highlighting the cycle.

Returning to FIGS. 1 and 2, the visualization constraint generator 120 generates 225 a visualization constraint for the circuit design 105 that corresponds to the overlay. A visualization constraint for a signal of a circuit design defines a desired behavior in waveforms generated for that signal. The visualization constraint generator 120 may generate "force" and/or "at least once" constraints based on the desired inputs. A "force" constraint specifies a particular value for a signal in a particular cycle. An "at least once" constraint specifies a behavior that occurs in one or more cycles of a waveform, but that is not limited to a particular cycle. In one embodiment, the designer specifies a type of constraint to generate. In another embodiment, the visualization constraint generator 120 determines the type of constraint to generate based on the user input for a cursor. For example, if a circuit designer provides an input at one cycle of one waveform, the visualization constraint generator 120 may generate a "force" constraint based on the designer's input. If the designer provides an input at two or more cycles of one signal wave, or two or more signal waves, the visualization constraint generator may generate an "at least once" constraint based on the designer's inputs.

Based on the user input, the visualization constraint generator 120 determines an identifier of the signal corresponding to the waveform (e.g., the name of the variable in the circuit design 105), the clock cycle in which the designer provided the input, and the value of the overlay generated in response to the designer's input. For "force" constraints, the visualization constraint generator 120 stores tuples of the form (signal ID, desired value, cycle ID). For "at least once" constraints, the visualization constraint generator 120 stores tuples of the form (signal IDs, desired values, relative cycle ID), where "relative cycle ID" identifies relative clock cycles of the signals identified by the signal IDs in which the desired values specified by the designer occur (e.g., simultaneous or consecutive cycles). In one embodiment, using the signal ID, desired value, and cycle ID, the visualization constraint generator 120 generates temporal expressions in a verification language, such as PSL or SVA, and stores the temporal expressions as visualization constraints of the circuit design 105. In other embodiment, the visualization constraints may not use a verification language to capture the constraints.

The visualization constraint generator 120 stores the generated constraints in the constraint store 125. In one embodiment, the waveform generation tool 110 retrieves visualization constraints from the constraint store 125 and uses the retrieved constraints to generate 230 an updated waveform that meets the constraints. The constraints restrict the signal values in the generated waveform, thereby causing the waveform to illustrate a behavior of the circuit design that is interesting to a circuit designer. The waveform generation tool 110 is configured to determine, for each visualization constraint, a set of inputs to the circuit design 105 that will result in waveforms having the desired behaviors. In one embodiment the constraints are constraints on internal signals or output signals of the circuit design, as opposed to constraints on input signals of the circuit design.

In one embodiment, verification properties are generated based on the overlay. Properties are temporal expressions defining relationships between signals of the circuit design, and can be described in a verification language, such as Property Specification Language (PSL) or System Verilog Assertions (SVA). Properties of the circuit design can include assertions, where the assertion is satisfied if the property is true for all operating conditions of the circuit design. An example of an assertion if "if A is 1, B must be 1 in the next clock cycle." The properties may include covers, where the cover is satisfied if the property is true for some operating condition of the circuit design. An example of a cover is "if A is 1, B could be 1 in the next clock cycle," if it is observed that B sometimes but not always occurs after A. The circuit design can then be tested against the properties during formal verification, which uses mathematical techniques to prove that properties are either always true or provide an example condition (called a counterexample) that demonstrates the property is false.

Figure 4:
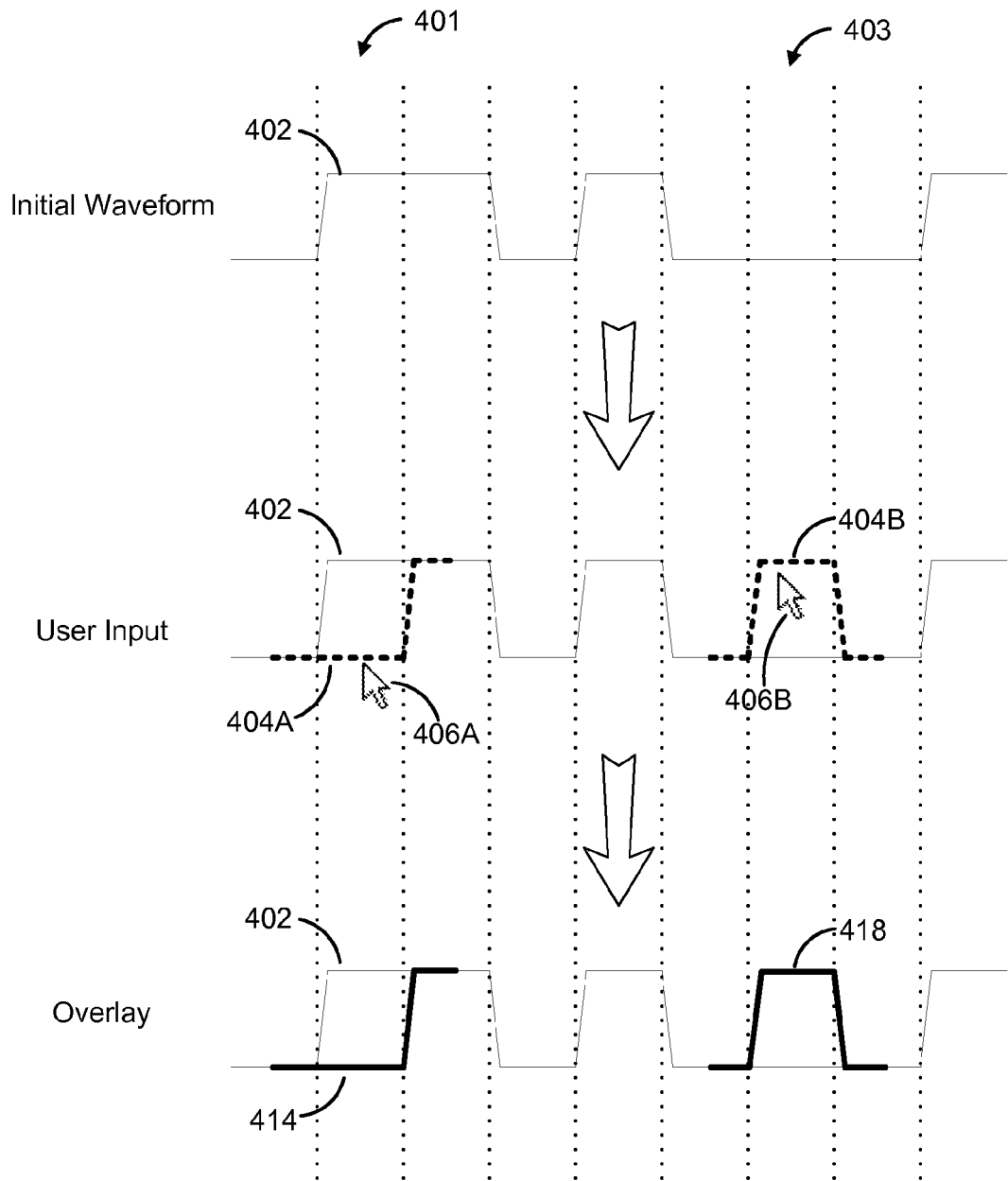
FIG. 4 illustrates an example user input at an overlay displayed on a waveform, according to one embodiment.

Several example user interfaces for generating visualization constraints are shown in FIGS. 4-9. Referring to FIG. 4, an initial waveform 402 as displayed to a circuit designer is illustrated, showing values of a signal over a plurality of cycles. In the illustrated example, the value of the signal corresponding to the waveform 402 is a binary 0 or 1 in each cycle. The overlay generation tool 115 receives a user input for the cursor 406. For example, the circuit designer uses a mouse to move cursor 406A until it is located within a spatial extent corresponding to cycle 401 and below the centerline of the initial waveform 402. An initial overlay 404A indicates a desired value of 0 in cycle 401 based on the location of the cursor 406A, as opposed to the actual signal value of 1. If the designer selects the initial overlay 404A (e.g. by a mouse click on the dotted line), indicating that 0 is the desired value in cycle 401, the overlay generation tool 115 generates and displays the overlay 414 to indicate to the designer that the desired value was received. Similarly, a user input is received when the circuit designer moves the cursor 406B until it is located within a spatial extent corresponding to cycle 403 of the waveform 402, and above the centerline of the waveform 402. An initial overlay 404B indicates a desired value of 1 in cycle 403 based on the location of the cursor 406B, as opposed to the actual signal value of 0. If the designer selects the initial overlay 404B, indicating that 1 is the desired value in cycle 403, the overlay generation tool 115 generates and displays the overlay 418 on the waveform 402 to indicate to the designer that the desired value was received. The visualization constraint generator 120 receives the inputs from the designer for the cursor 406 and generates visualization constraints based on the inputs. For example, if waveform 402 corresponds to signal A, the constraints generated by the visualization constraint generator 120 in response to the user inputs illustrated in FIG. 4 are "force signal A to 0 at cycle 401" and "force signal A to 1 at cycle 403." Alternatively, the visualization constraint generator 120 may generate one constraint as "at least once, the signal A must have value 1 at five cycles after the signal A has value 0."

Figure 5:
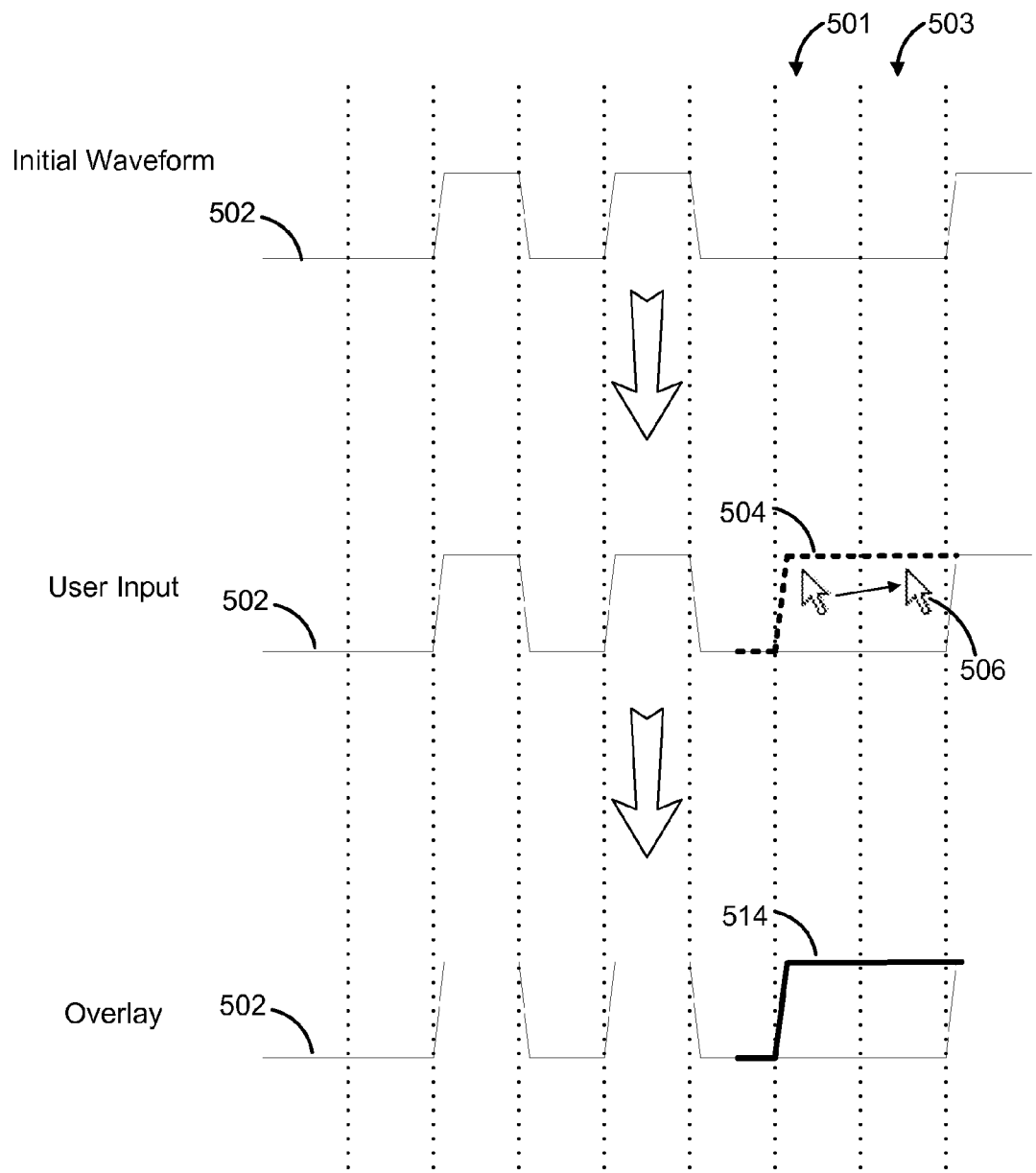
FIG. 5 illustrates an example user input at an overlay displayed on a waveform, according to one embodiment.

FIG. 5 illustrates a second example of generating visualization constraints. An initial waveform 502 is generated by the waveform visualization tool 110 and displayed to the circuit designer. The overlay generation tool 115 receives a user input when the designer moves the cursor 506 to a spatial extent corresponding to cycle 501 of the waveform 502. An initial overlay 504 indicates a value of 1 in cycle 501 based on the location of the cursor 506. When the cursor 506 is located in the spatial extent of cycle 501, the designer clicks and drags the value of 1 to clock cycle 503 by dragging the cursor 506 to a spatial extent corresponding to cycle 503. In response to the user input, the overlay generation tool 115 displays the overlay 504 on the waveform 502 illustrating the desired values in cycles 501 and 503 to the designer. The overlay 504 may be selected or confirmed by the user, resulting in final overlay 514. The visualization constraint generator 120 generates visualization constraints based on the desired signal values indicated by the overlay 514. For example, if waveform 502 corresponds to signal B, the constraints generated by the visualization constraint generator 120 in response to the user inputs illustrated in FIG. 5 may be "force signal B to 1 at cycle 501" and "force signal B to 1 at cycle 503." Alternatively, the visualization constraint generator 120 may generate the constraint "at least once, signal B is 1 in two consecutive clock cycles."

Figure 6:
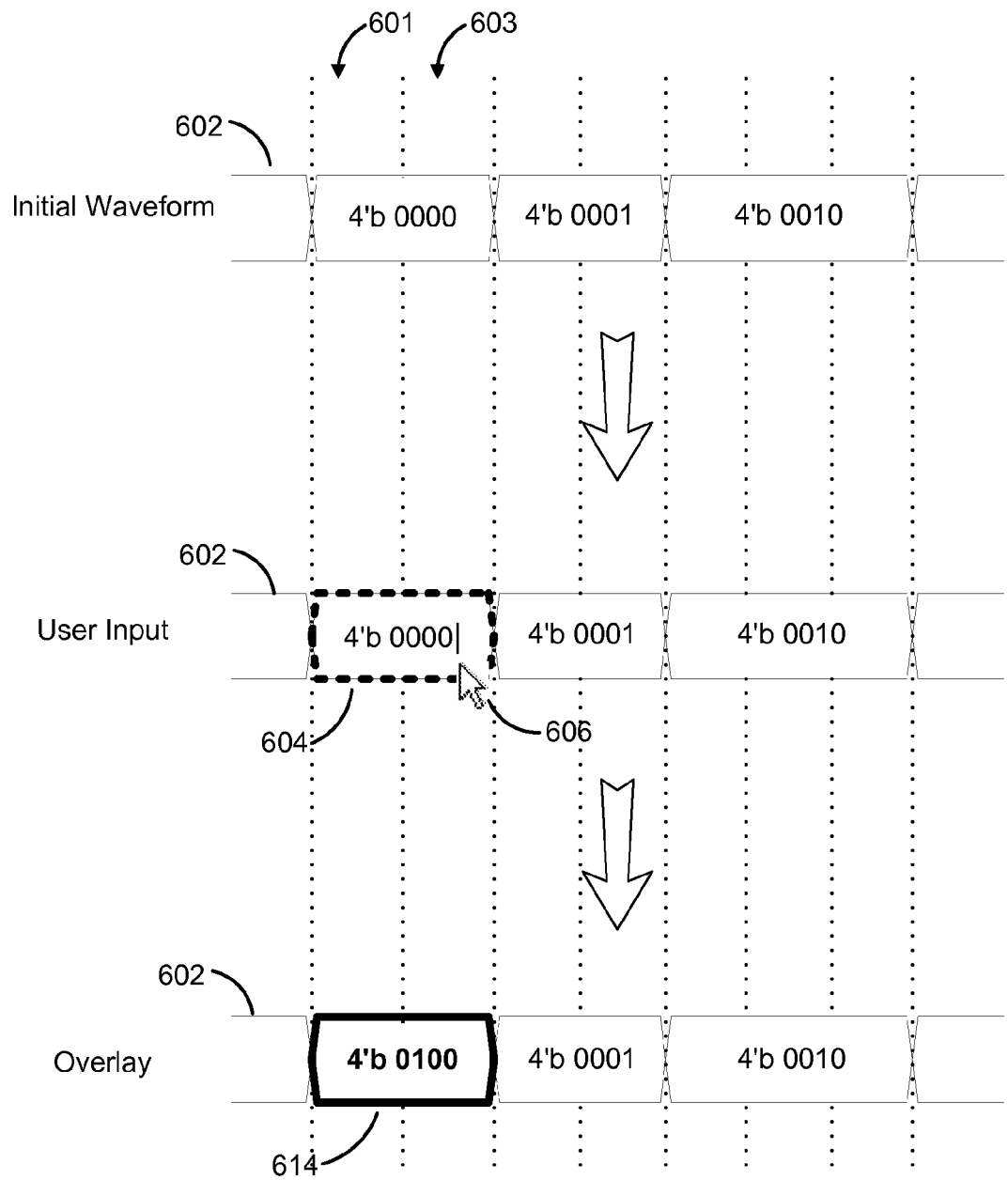
FIG. 6 illustrates an example user input at an overlay displayed on a waveform, according to one embodiment.

FIG. 6 illustrates another example of generating visualization constraints. In FIG. 6, the initial waveform 602 corresponds to a signal comprising a sequence of four-bit bus values. The overlay generation tool 115 receives a user input when the designer moves the cursor 606 to a spatial extent corresponding to cycle 603 of the waveform 602. An initial overlay 604 is displayed on the waveform 602. In the example illustrated in FIG. 6, the initial overlay 604 includes an input box configured to receive a desired value for the bus block in cycles 601 and 603 from the designer. For example, as illustrated in FIG. 6, the designer inputs the desired value '0100' to change the value of the signal in cycles 601 and 603 from the actual value of '0000' to the desired value of '0100.' In response to the designer's input, the overlay generation tool 115 generates and displays the overlay 614 on the waveform 602, indicating the desired value 0100 in clock cycles 601 and 603. The visualization constraint generator 120 generates a constraint based on the overlay 614. For example, if waveform 602 corresponds to signal C, the constraint may be "force signal C to 0100 in clock cycles 601 and 603," or "at least once, signal C is 0100 in two consecutive cycles."

Figure 7:
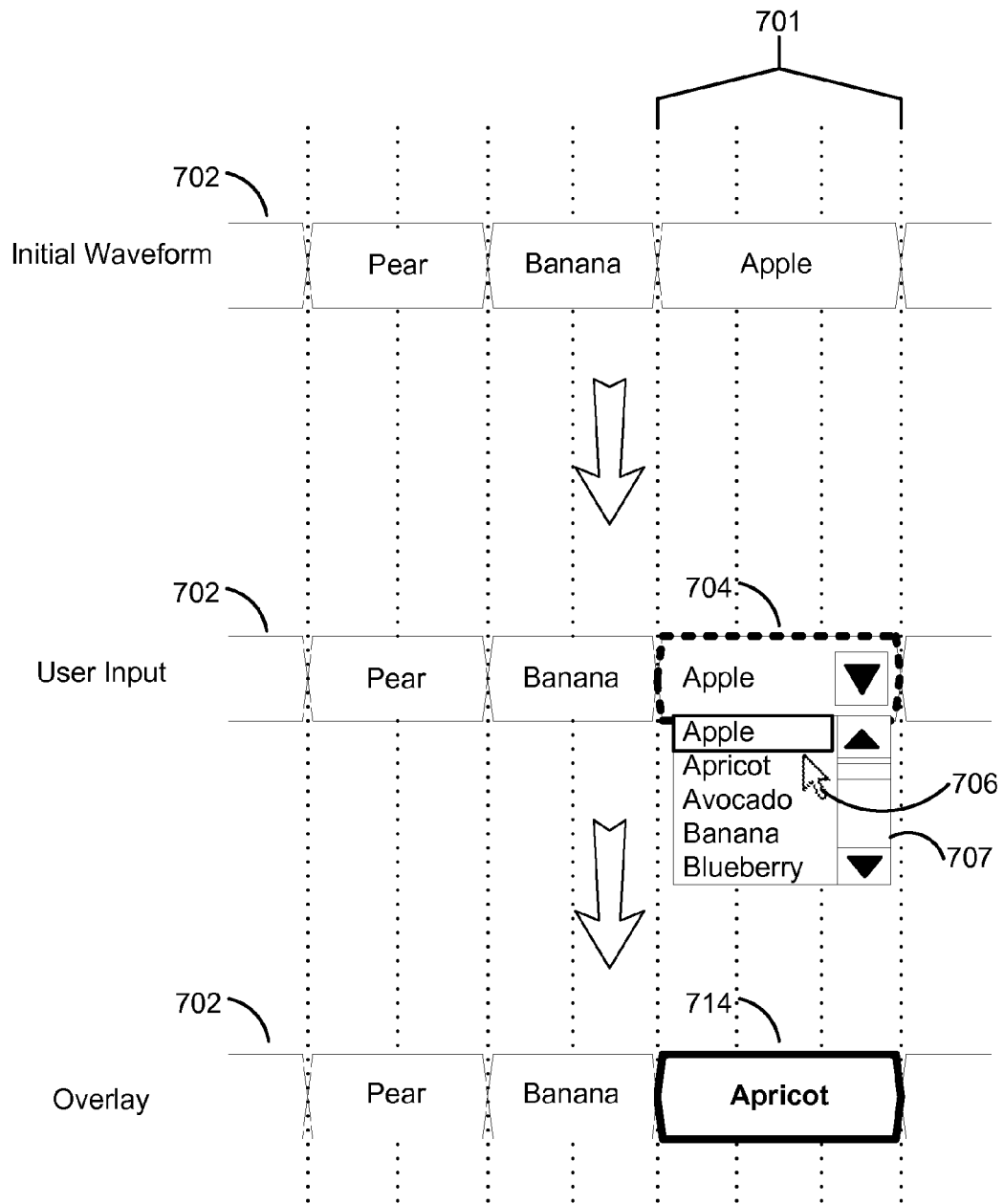
FIG. 7 illustrates an example user input at an overlay displayed on a waveform, according to one embodiment.

FIG. 7 illustrates yet another example of generating visualization constraints. In FIG. 7, the initial waveform 702 displayed to the circuit designer corresponds to a signal including a sequence of enumerators (e.g., "pear," "banana," and "apple") of an enumerated type. The overlay generation tool 115 receives a user input when the designer moves the cursor 706 to a spatial extent corresponding to the set 701 of clock cycles. An initial overlay 704 is displayed on the waveform 702. In the example illustrated in FIG. 7, the initial overlay 604 includes a list 707 of the possible values of the enumerated type. The designer selects a desired value from the list 707, and the overlay generation tool 115 displays the overlay 714 illustrating the desired value selected by the designer. In response to the designer's selection of an enumerator, the visualization constraint generator 120 generates a constraint. For example, if waveform 702 corresponds to signal D, the constraint may be "force signal D to 'apricot'" in cycles 701," or "at least once, signal D is 'apricot' in three consecutive cycles."

Figure 8:
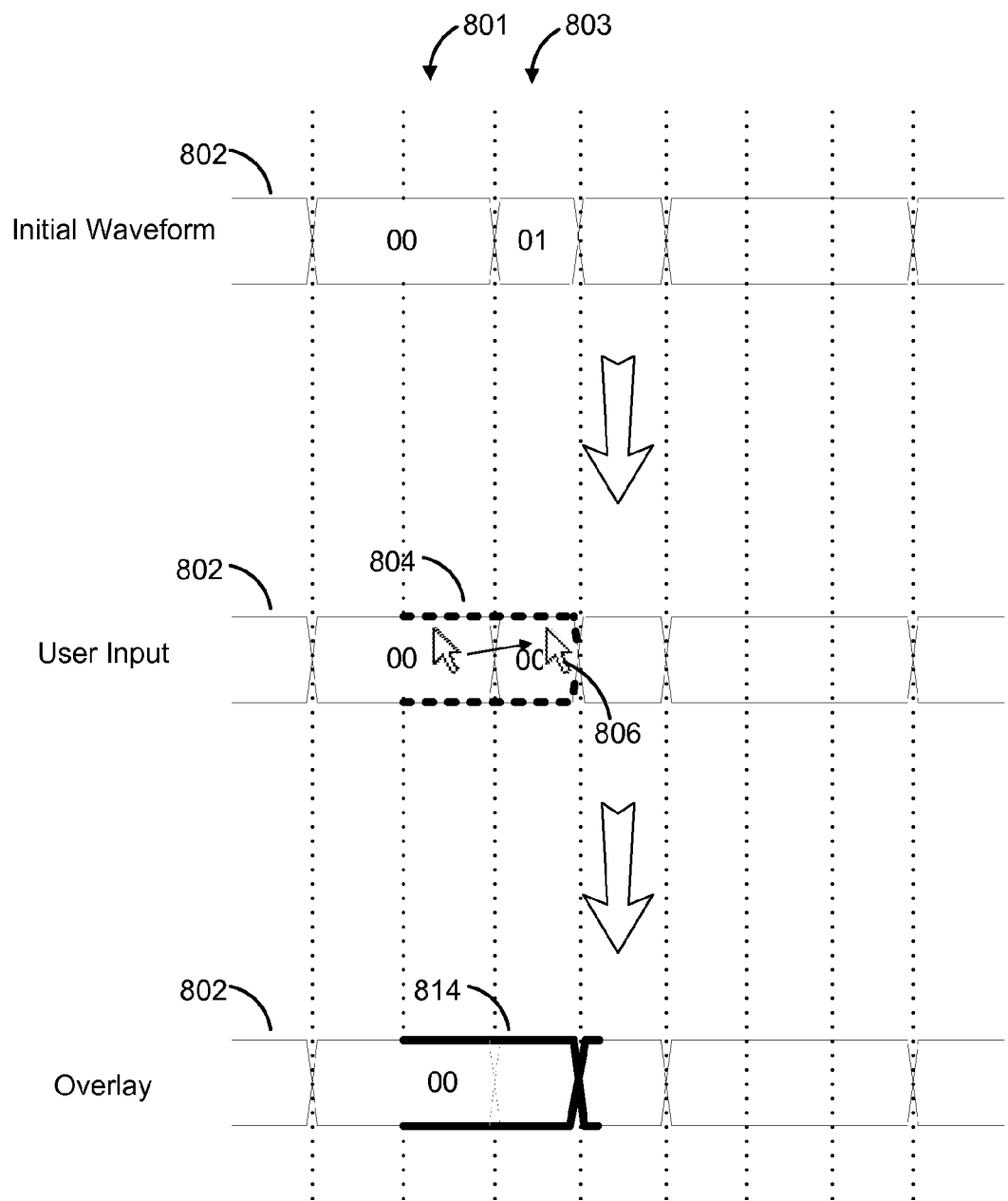
FIG. 8 illustrates an example user input at an overlay displayed on a waveform, according to one embodiment.

A further example of generating visualization constraints is illustrated in FIG. 8. The initial waveform 802 comprises a sequence of bus values or enumerators of an enumerated type. The overlay generation tool 115 receives a user input when the designer moves the cursor 806 to a spatial extent corresponding to cycle 801. An initial overlay 804 is displayed on the waveform 802 in cycle 801 based on the location of the cursor 806. When the cursor 806 is located in the spatial extent of cycle 801, the designer clicks and drags the value of 00 to clock cycle 803 by dragging the cursor 806 to the cycle 803. Accordingly, the designer indicates that the value of the signal in cycle 801 is the desired value of the signal in cycle 803. The overlay generation tool 115 generates and displays the overlay 814, indicating that the desired value of the signal in cycle 803 is 00 instead of the initially-displayed value of 01. In response to the designer's inputs, the visualization constraint generator 120 generates a constraint forcing the values of the waveform 802 in cycles 801 and 803 to be 00 or constraining the waveform 802 to having the value 00 in two consecutive cycles.

Figure 9:
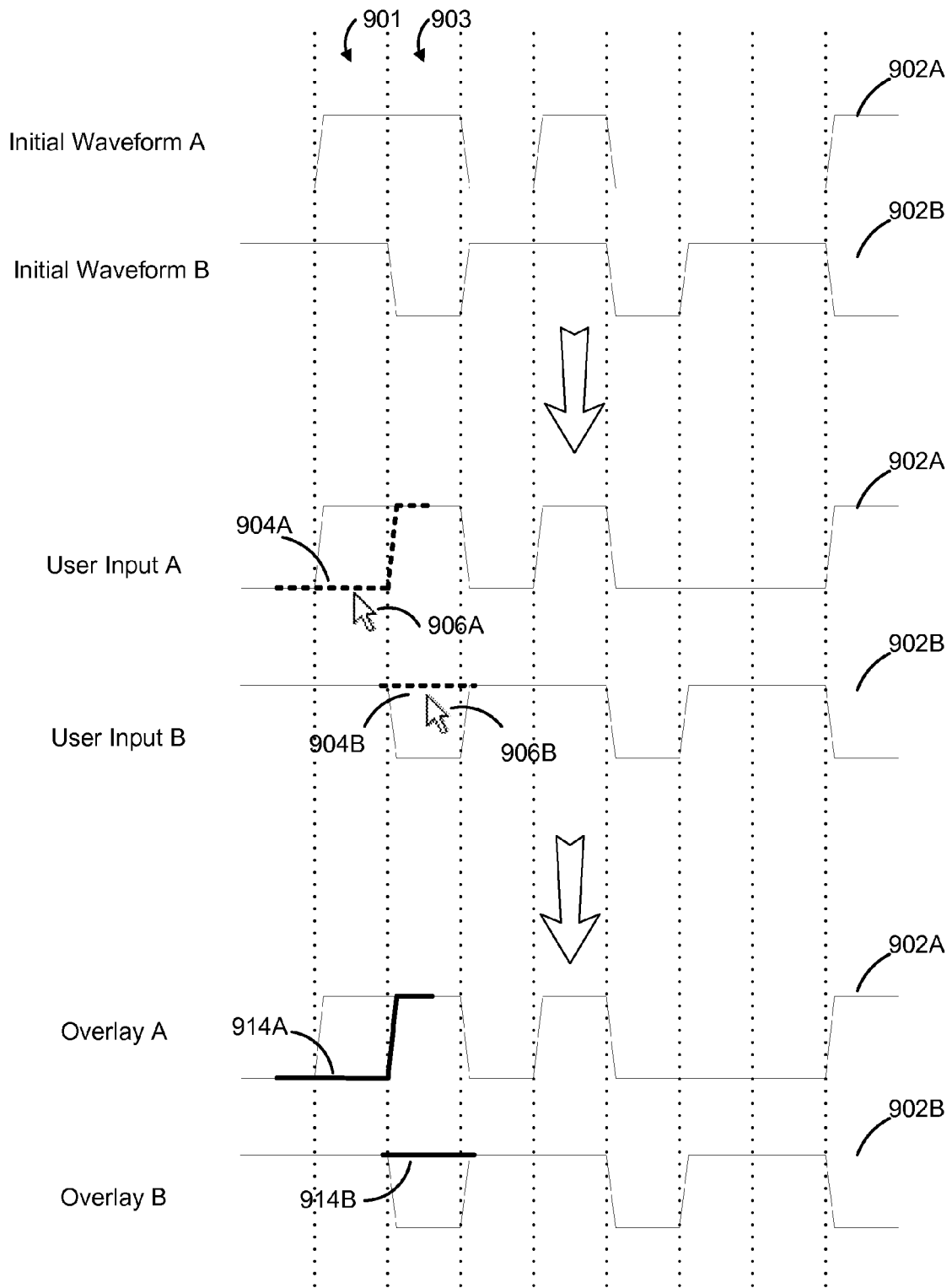
FIG. 9 illustrates example user inputs at overlays displayed on multiple waveforms, according to one embodiment.

Although FIGS. 4-8 each illustrate one waveform with which a circuit designer interacts, multiple waveforms may be displayed simultaneously to a circuit designer, where each waveform corresponds to a different signal in the circuit design 105. In one embodiment, if multiple waveforms are displayed to a circuit designer, the visualization constraints generated in response to the designer's inputs depend on a number of waveforms the designer interacted with. FIG. 9 illustrates an example of generating visualization constraints when the circuit designer is interacting with two waveforms, waveforms 902A and 902B. When the cursor 906A is located within a spatial extent corresponding to cycle 901 and below the centerline of the waveform 902A, the overlay generation tool 115 generates an initial overlay 904A indicating a desired value of 0 in cycle 901 of waveform 902A as opposed to the actual value of 1. The designer selects the overlay 904A, indicating that it is the desired value in cycle 901. In response to the designer's input, the overlay generation tool 115 generates and displays the overlay 914A to indicate the desired value. Similarly, the cursor 906B is located within a spatial extent corresponding to cycle 903 of the waveform 902B, and above the centerline of the waveform 902B. The initial overlay 904B generated by the overlay generation tool 115 in response to receiving the user input moving the cursor 906B to a position indicating a desired value of 1 in cycle 903 of waveform 902B as opposed to the actual value of 0. The designer selects the initial overlay 904B, indicating that 0 is the desired value in cycle 903, and the overlay generation tool 115 generates and displays the overlay 914B to indicate to the designer that the desired value was received. Based on the overlays 904, the visualization constraint generator 120 generates visualization constraints. In one embodiment, because the designer interacted with overlays across multiple waveforms and multiple cycles, the visualization constraint generator 120 generates an "at least once" constraint for the designer's interactions. For example, the constraint generated in response to the inputs illustrated in FIG. 9 may be, "at least once, waveform B is one in a clock cycle subsequent to a cycle in which waveform A is zero."

Accordingly, embodiments described herein provide an interactive method for circuit designers to generate visualization constraints for circuit designs. Rather than typing a temporal expression into an entry box displayed in a different area of a display screen than the waveforms, the designer interacts with the waveform to specify desired behaviors. Moreover, the overlay provides an intuitive method for generating visualization constraints, enabling the circuit designer to generate constraints despite a lack of fluency in a verification language.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer program product for interactively generating constraints for a circuit design, the computer program product comprising a non-transitory computer-readable storage medium comprising computer program code for:
   receiving a first waveform for the circuit design, the first waveform indicating at least an actual value of a signal of the circuit design in one or more clock cycles;
   displaying a signal wave overlay on the first waveform in the one or more clock cycles, the signal wave overlay having an appearance corresponding to a specified location and indicating a desired value of the signal in the one or more clock cycles, wherein the desired value is different from the actual value of the signal in the one or more clock cycles;
   generating a visualization constraint for the circuit design based at least in part on the desired value of the signal indicated by the signal wave overlay; and
   generating a second waveform for the circuit design that satisfies the visualization constraint.

2. The computer program product of claim 1, wherein the visualization constraint includes a force constraint that must be satisfied by the second waveform during the one or more clock cycles.

3. The computer program product of claim 1, wherein the visualization constraint comprises an at least once constraint that must be satisfied by the second waveform at least once during a clock cycle.

4. The computer program product of claim 1, wherein the signal comprises a single-bit signal, and the desired value comprises a single bit desired value.

5. The computer program product of claim 4, further comprising:
   determining whether the specified location is above or below a centerline of the first waveform, wherein
      the appearance of the signal wave overlay is based at least in part on whether the specified location is above or below a centerline of the first waveform, the appearance of the signal wave overlay indicating that the desired value of the signal is either a binary one or a binary zero.

6. The computer program product of claim 1, wherein the signal comprises a multi-bit signal, and the desired value comprises a multi-bit desired value.

7. The computer program product of claim 6, further comprising:
   receiving an input specifying the multi-bit desired value of the signal in the one or more clock cycles, wherein
      the signal wave overlay indicates the multi-bit desired value of the signal.

8. The computer program product of claim 1, further comprising:
   receiving a selection of the desired value of the signal from a list of enumerated values of an enumerated type defined for the signal.

9. The computer program product of claim 1, wherein generating the visualization constraint comprises generating the visualization constraint without displaying a temporal expression of the visualization constraint.

10. The computer program product of claim 1, wherein the first waveform further indicates a first actual value of a first signal of the circuit design in one or more second clock cycles, and further comprising:
   receiving a first specified location; and
   displaying a first signal wave overlay on the first waveform in the one or more second clock cycles, the second signal wave overlay having an appearance corresponding to a location as a result of the first specified location and indicating a first desired value of the first signal in the one or more second clock cycles, wherein the first desired value is different from the first actual value of the first signal in the one or more first clock cycles, wherein the visualization constraint is further generated based at least in part on the first desired signal value indicated by the first signal wave overlay.

11. The computer program product of claim 1, wherein the signal wave overlay indicates the desired value of the signal in at least one clock cycle that is the actual value of the signal in the at least one clock cycle.

12. The computer program product of claim 1, wherein the signal wave overlay indicates the desired value of the signal in a first clock cycle, and generating the visualization constraint comprises:
   generating the visualization constraint associated with a second clock cycle based at least in part on the desired value of the signal in the first clock cycle.

13. A computer implemented method for interactively generating constraints for a circuit design, the method comprising:
   receiving a first waveform for the circuit design, the first waveform indicating at least an actual value of a signal of the circuit design in one or more clock cycles;
   displaying a signal wave overlay on the first waveform in the one or more clock cycles, the signal wave overlay having an appearance corresponding to a specified location and indicating a desired value of the signal in the one or more clock cycles, wherein the desired value is different from the actual value of the signal in the one or more clock cycles;
   generating a visualization constraint for the circuit design based at least in part on the desired value of the signal indicated by the signal wave overlay; and
   generating a second waveform for the circuit design that satisfies the visualization constraint.

14. The method of claim 13, wherein the visualization constraint comprises a force constraint that must be satisfied by the second waveform during the one or more clock cycles.

15. The method of claim 13, wherein the visualization constraint comprises an at least once constraint that must be satisfied by the second waveform at least once during a clock cycle.

16. The method of claim 13, wherein the signal comprises a single-bit signal, and the desired value comprises a single-bit desired value.

17. The method of claim 16, further comprising:
determining whether the specified location is above or below a centerline of the first waveform, wherein
the appearance of the signal wave overlay is based at least in part on whether the specified location is above or below the centerline of the first waveform, and
the appearance of the signal wave overlay indicates that the desired value of the signal is either a binary one or a binary zero.

18. The method of claim 13, wherein the signal comprises a multi-bit signal and the desired value comprises a multi-bit desired value.

19. The method of claim 18, further comprising:
receiving an input specifying the multi-bit desired value of the signal in the one or more clock cycles, wherein
the signal wave overlay indicates the multi-bit desired value of the signal.

20. The method of claim 13, further comprising:
receiving a selection of the desired value of the signal from a list of enumerated values of an enumerated type defined for the signal.

21. The method of claim 13, wherein generating the visualization constraint comprises generating the visualization constraint without displaying a temporal expression of the visualization constraint.

22. The method of claim 13, wherein the first waveform further indicates a first actual value of a first signal of the circuit design in one or more first clock cycles, and the method further comprises:
displaying a first signal wave overlay on the first waveform in the one or more first clock cycles, the first signal wave overlay having an appearance corresponding to a first specified location specified by a user and indicating a first desired value of the first signal in the one or more first clock cycles, wherein
the first desired value is different from the first actual value of the first signal in the one or more first clock cycles, and
the visualization constraint is further generated based at least in part on the first desired value indicated by the first signal wave overlay.

23. The method of claim 13, wherein the signal wave overlay indicates the desired value of the signal in at least one clock cycle, wherein the desired value is the actual value of the signal in the at least one clock cycle.

24. The method of claim 13, wherein the signal wave overlay indicates the desired value of the signal in a first clock cycle, and generating the visualization constraint comprises:
generating the visualization constraint associated with a first clock cycle based at least in part on the desired value of the signal in the first clock cycle.

* * * * *